(12) United States Patent
Oxrieder et al.

(10) Patent No.: US 8,225,138 B2
(45) Date of Patent: Jul. 17, 2012

(54) HIGH-SPEED RECOVERY FOR COMPUTING SYSTEMS

(75) Inventors: Charles B. Oxrieder, Wake Forest, NC (US); Rod D. Waltermann, Rougemont, NC (US); Liang Chen, Raleigh, NC (US); Yi Zhou, Raleigh, NC (US); Jonathan G. Knox, Morrisville, NC (US); Liu ChunMei, Beijing (CN); Qiu Jun, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 158 days.

(21) Appl. No.: 12/415,056

(22) Filed: Mar. 31, 2009

(65) Prior Publication Data

US 2010/0251172 A1 Sep. 30, 2010

(51) Int. Cl.
*G06F 11/00* (2006.01)
(52) U.S. Cl. ........................................................ 714/15
(58) Field of Classification Search .................. 714/15
See application file for complete search history.

(56) References Cited

U.S. PATENT DOCUMENTS

| | | | | |
|---|---|---|---|---|
| 6,952,758 B2* | 10/2005 | Chron et al. | ................... | 711/162 |
| 2005/0091288 A1* | 4/2005 | Ji et al. | ........................... | 707/200 |
| 2005/0132351 A1* | 6/2005 | Randall et al. | ................ | 717/168 |
| 2005/0132357 A1* | 6/2005 | Shell et al. | ..................... | 717/174 |
| 2006/0179347 A1* | 8/2006 | Anderson et al. | ............... | 714/16 |
| 2008/0104442 A1* | 5/2008 | Diao et al. | ........................ | 714/3 |
| 2010/0037096 A1* | 2/2010 | Bum et al. | ...................... | 714/19 |
| 2010/0248707 A1* | 9/2010 | Hoffner et al. | ................ | 455/419 |
| 2010/0262962 A1* | 10/2010 | Chaganti | ........................ | 717/174 |
| 2011/0107331 A1* | 5/2011 | Evans et al. | ....................... | 718/1 |

\* cited by examiner

*Primary Examiner* — Amine Riad
(74) *Attorney, Agent, or Firm* — Ference & Associates LLC (57) ABSTRACT

The invention broadly contemplates a computing system that offers high-speed recovery. The system is configured to offer such a high-speed solution via an instant roll back scheme. The system utilizes a virtualization to handle the system state and provide a rescue and recovery like solution without requiring a full system reboot. The system is configured to utilize virtualization, e.g. through the use of a hypervisor to track the fundamental system components. This enables the system to very quickly back the system up on a rolling basis via tracking atomic changes and offering the instant rollback at essentially any point following an atomic change, should common system difficulties be encountered.

20 Claims, 5 Drawing Sheets

HIGH-SPEED RECOVERY FOR COMPUTING SYSTEMS

FIELD OF THE INVENTION

This invention is directed to rescue and recovery solutions for computing systems. Specifically, this invention is directed systems, apparatuses and methods for performing high-speed rescue and recovery operations in computing systems.

BACKGROUND OF THE INVENTION

Computing systems, including electronic devices such as laptop and desktop personal computers (PCs), workstations, and/or mobile computing devices, etc., encounter a number of difficulties as a matter of course. Common difficulties include attacks from viruses or other malicious code, accidental deletion of files, etc. Regardless of the source, these commonly encountered difficulties require rescue and recovery solutions.

Conventional rescue and recovery solutions ("solutions") have substantial drawbacks. Notably, conventional solutions take time and consume system resources (e.g. periodic backup of data by an application running in the background). These conventional solutions often depend on a service partition and a set of manufacturer defined recovery processes or a normal, scheduled backup scheme (e.g. once per, day, week, etc.). The regularly scheduled backups result in a time consuming and resource intensive copying of large amounts of data. The conventional solutions often require rebooting into a second, typically lightweight operating system (OS) to perform recovery from a service partition. This process is generally slow, processing intensive, non-intuitive and the service partition is vulnerable to security threats.

Accordingly, a need has arisen for a computer system that offers the user a solution for restoring and recovering the system in a timely and user-friendly manner.

SUMMARY OF THE INVENTION

According to one presently preferred embodiment, the instant invention broadly contemplates a computing system that offers high-speed recovery. The system is configured to offer such a high-speed solution via an instant roll back scheme. The system utilizes a virtualization to handle the system state and provide a rescue and recovery like solution without requiring a full system reboot. The system is configured to utilize virtualization, e.g. through the use of a hypervisor to track the fundamental system components. This enables the system to very quickly back the system state up on a rolling basis via tracking atomic changes and offering the instant rollback at essentially any point following an atomic change, should common system difficulties be encountered.

In summary, one aspect of the invention provides an apparatus comprising: a processor; and a tangible program storage device embodying a program of instructions that when executed by the processor enable the apparatus to: direct all atomic changes to incremental regions of a storage device; continuously create roll back points corresponding to atomic changes; and roll a system state back to any roll back point.

Another aspect of the invention provides a method comprising: directing all atomic changes to incremental regions of a storage device; continuously creating roll back points corresponding to atomic changes; and rolling a system state back to any roll back point.

A further aspect of the invention provides a tangible program storage device, readable by machine, embodying a program of instruction that when executed by a processor of the machine enable the machine to: direct all atomic changes to incremental regions of a storage device; continuously create roll back points corresponding to atomic changes; and roll a system state back to any roll back point.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

It will be readily understood that the components of the present invention, as generally described and illustrated in the figures herein, may be arranged and designed in a wide variety of different configurations in addition to the described presently preferred embodiments. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected presently preferred embodiments of the invention as claimed herein.

Conventionally, in a classroom or kiosk type environment, the file systems of computers are either set up to redirect writes or configured to utilize a read-only file system. With these conventional solutions, the system is rebooted to restore it to a pristine state (e.g. at the end of the day). Building on this technique, the instant invention utilizes virtualization to enable an instant roll back scheme to be employed.

Accordingly, the instant invention broadly contemplates a computing system that offers high-speed recovery. The system is configured to offer such a high-speed solution via an instant roll back scheme. The system utilizes virtualization to handle the system state and provide a rescue and recovery like solution without requiring a full system reboot. The system is configured to utilize a hypervisor to track the fundamental system components (e.g. memory, central processing unit (CPU), hard disk drive (HDD), device state). This enables the system to very quickly back the system up on a rolling basis and offer the instant rollback should common system difficulties be encountered.

An embodiment of the invention offers system state backup in what is referred to as an "instant safe mode" by continuously tracking atomic changes and offering instant rollback to any atomic change point. An atomic change is defined herein as a write operation. For example, as data is being written to the disk, there is a set of operations that need to be performed (e.g. at a specific location on the disk, a certain number of sectors are written, then the block is closed out). This is an example of an atomic change. These atomic changes are stored in incremental regions of the disk.

An embodiment of the invention offers rolling HDD data backup. Since the system utilizes a hypervisor, the hypervisor has the ability to monitor HDD accesses (e.g. write operations). This monitoring can be harnessed to keep track of file changes (e.g. writes) the user performs during daily activities. As the user makes changes to files, a service running in the hypervisor will create "restore points" on the fly (e.g. one per file change/atomic change committed). Using inter-domain communication, the user can access these restore points and/or do single-file restore through a simple operation. This will not require a timely reboot (e.g. into a different OS), nor will it require a service partition that is open to various security threats.

It should be noted that the tracking of atomic changes or operations as used herein is distinct form a journaling system because the data (e.g. the drive commands themselves) is not being stored for e.g. repair activities. Rather, the instant invention stores the data that is ultimately rendered by the change as a rolling restore/rollback point.

An embodiment of the invention employs rolling backup methods based on region rather than making copies of the existing data (e.g. as contemplated by conventional backup schemes). According to the invention, the disk is separated into regions that may contain HDD changes, memory and system state data, such that regions denoted as "backup" areas are frozen to changes. All the data in a region is from the same time slice and as such is synchronized. At any point in time, at least one "active" region is available for reading and writing operations. The hypervisor creates an active region on the disk at a predefined time interval and redirects writes to the active region.

The predetermined time for creating an active region could be continuously (i.e. an instant safe mode—at every atomic operation), at a given time interval (i.e. every two weeks) or at a user initiated time. Thus, the predetermined time dictates the available rollback points—i.e. aggregates changes periodically (e.g. the active region can be compressed every two weeks such that a rollback can be made to any atomic change within two weeks, but rolling back beyond two weeks is limited to two-week intervals). The predetermined time is configurable as desired.

For example, when the user selects to save a file system state, the hypervisor will pause/suspend the system. The hypervisor calls the HDD data backup to create a an incremental region on the HDD. The hypervisor will record memory and save the state of the virtual machine (e.g. CPU and devices) to the newly created incremental region of the disk. This ensures that the HDD backup, memory and system state data are time synchronized (which in turn guarantees a restore of the system that will not cause any phasing issues between the CPU instructions being executed and the cache memory).

When a read operation occurs, the hypervisor checks to determine if there has been an update in an active region for the corresponding read, and if so, the active region data (having the update) will be returned. If no update has taken place to the file to be read, the most current (updated) data exists in the frozen region, and this is the data the will be returned for the read.

At least one embodiment of the invention provides a method of backup accomplished by a hypervisor redirecting writes to a region of the disk. This region contains the sectors changed and a journal log (e.g. table) of all the transactions. Each file in the OS is composed of sectors on the disk. By using the file system entries in conjunction with the journaled entries, a single file restore point can be calculated. Since a given file may have been relocated (e.g. via a file move or a de-fragmentation operation), when a file is restored, the invention looks forward in the regions for journal entries impacting the given file.

The regions after the restore point will thus be examined for journal entries containing the sectors tagged for restore and additionally for other entries impacting the file. If the tagged sectors and the rest of the file are in a new location, the invention will calculate a hash value of the file to be restored and the data currently on the disk in the new location with the changes applied in memory. If the hash value(s) are the same, the file will be restored in its new sectors (file re-enabled at location). Otherwise, the file will be completely rewritten to a restore location (i.e. if file has changed it is written to a new location). If the file has not been moved, then only the changed sectors will be restored. If the file has not moved and a user chooses to restore back to a prior region, any regions after the selected restore region are preferably invalidated. This ensures that interrelated changes, once rolled back, do not result in corrupted data. If a user chooses to roll back to a previous region, select a file from that region, and copy it forward to the latest state of the system (copy from previous backup-restore to latest); this does not require invalidation.

Accordingly, when a user selects to restore his or her system, a selection will be presented (e.g. via an application program running in the OS) with available backup points. The backup points will include HDD back up (e.g. periodically saved) or instant safe mode (e.g. continuous per atomic operation) rollback points. Either could be initiated by the user or time scheduled (automatic restore at a given time—e.g. 6:00 p.m. each day for a kiosk implementation). When the user selects to backup the data available is restored to the system and depending on the amount of data collected, the user will be informed if they have to restart/reboot the system. For example, if the user selects to restore in the instant safe mode, the system will not have to be restarted since the state of the system is completely restored. If the user selected a HDD back up which has OS file system changes, the OS would need to be restarted to ensure that any newly restored files are loaded into memory.

Figure 1:
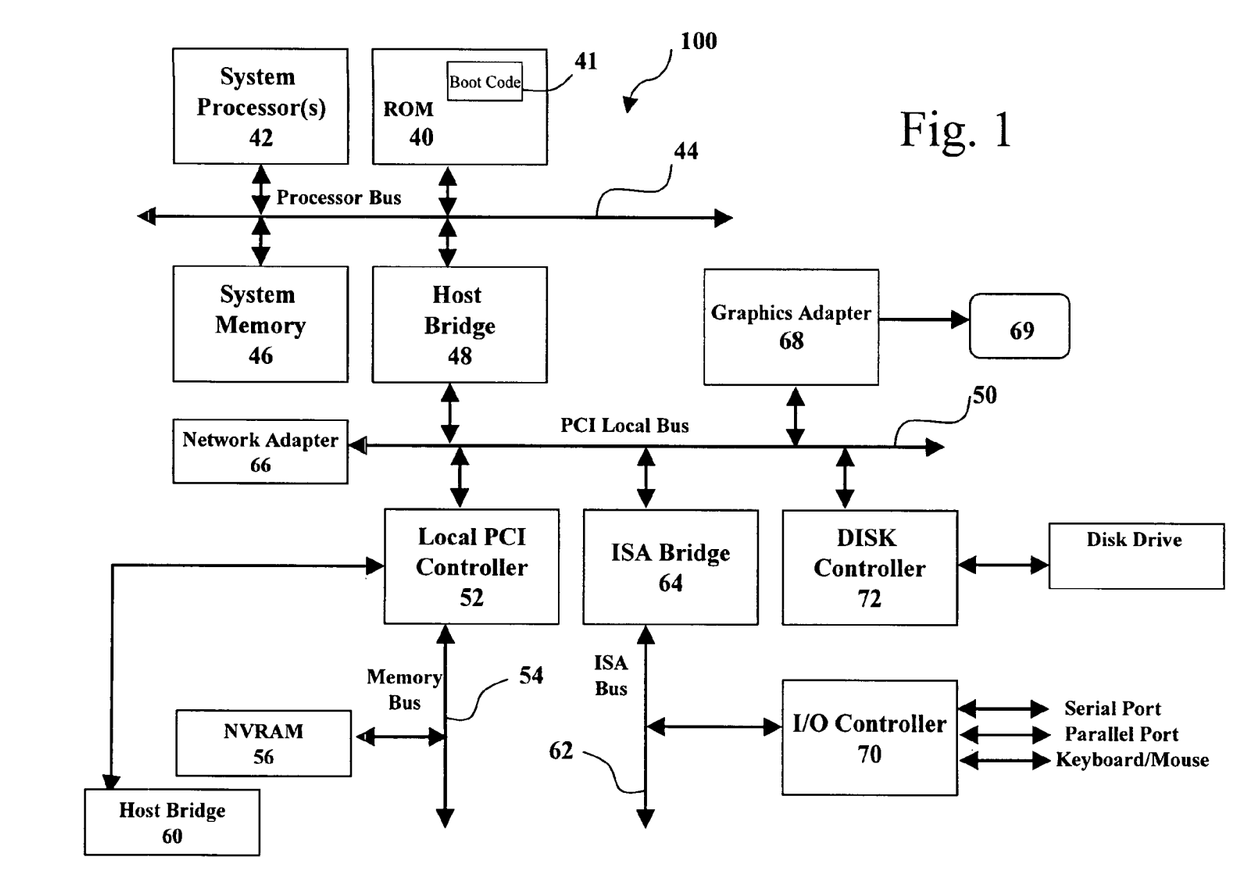
FIG. 1 is a block diagram of a computer system.

Referring now to FIG. 1, there is depicted a block diagram of an illustrative embodiment of a computer system 100. The illustrative embodiment depicted in FIG. 1 may be a notebook computer system, such as one of the ThinkPad® series of personal computers sold by Lenovo (US) Inc. of Morrisville, N.C. or a workstation computer, such as the Thinkstation®, which is also sold by Lenovo (US) Inc. of Morrisville, N.C. As will become apparent from the following description, however, the present invention is applicable to operation by any data processing system or other electronic device with similar components.

As shown in FIG. 1, computer system 100 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN 10, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, and a disk drive. In addition, I/O controller 70 supports external communication by computer system 100 via serial and parallel ports. The USB Bus and USB Controller (not shown) are part of the Local PCI controller (52).

Figure 2:
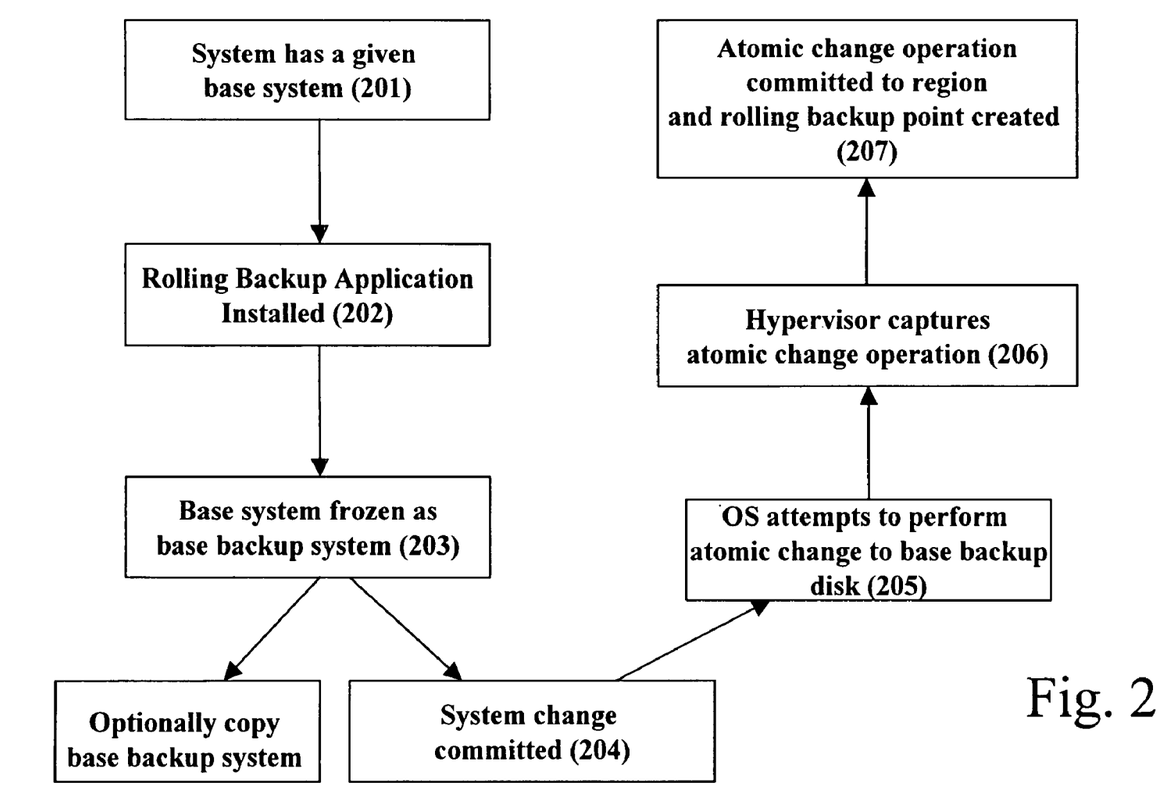
FIG. 2 illustrates a method for setting a base system and creating continuous rollback points.

Referring to FIG. 2, an overview of the set up and operation of the rolling backup system is illustrated. When a user sets up the system, the OS (e.g. Microsoft Windows XP® operating system) is installed, and a certain base system is present (201). At an initial point (202), the backup application of the instant invention is installed for the first time. This creates a "base backup system" point. This base backup system is frozen (203) by the backup application in the sense that no subsequent changes (e.g. writes) are permitted to this base backup system. This ensures that the base backup system is accessible on demand. All future system changes (204) (e.g. writes) are now archived off to a region of the disk as part of the rolling backup process. Thus, all future atomic operations that are performed by the user (205) are viewed as change operations from the point in time when the backup application is installed and the rolling backup process begins. These change operations are captured (206) by the hypervisor and transparently redirected to the region (207).

Accordingly, if a file in the base backup system is to be changed (e.g. written to), the change is not committed to the base backup system, but is rather treated as a change operation and performed elsewhere via the hypervisor. Use of the hypervisor makes this change operation transparent to the user (i.e. the OS) and as such it appears that the change has actually been committed to the base backup system (described in more detail below).

One of the key advantages of employing the rolling backup system is that the rolling points (e.g. atomic changes) are created extremely fast, as compared to a conventional backup scheme (i.e. periodically saving the disk as a restore point means copying large amounts of data). As a non-limiting example, if the user's system has 10 GB of data at the initialization point (i.e. in the base backup system), the 10 GB will not have to be copied for backup anywhere, as the base backup system is frozen (i.e. cannot be changed—e.g. written to). Of course, the original 10 GB of data (and any subsequent changes) could be optionally copied (e.g. to a remote storage device) to prevent against a disastrous event (e.g. system crash, the event a total system restore is needed), but it does not have to be to take advantage of the continuous rollback scheme.

Thus, an embodiment of the invention allows for nearly instantaneous rollback operations in the event that a difficulty is encountered because continuous backup (i.e. per atomic change) is employed. For example, if a user unintentionally deletes a file, the user is enabled to instantaneously roll the system back to a previous point in time prior to the encountered difficulty (e.g. recover a previously saved version of the file). This is nearly instantaneous because no data needs to be copied or moved about on the disk because no actual changes have been committed to the base backup system and subsequent file versions are saved separately. All that is required is for the system to unroll the changes archived to the chosen rollback point. Thus, short of a disastrous hard disk failure, the invention enables the system to instantaneously recover from essentially any encountered difficulty via the simple and quick rollback solution without rebooting. In the case of a disastrous hard disk failure (or like problem), the optionally copied base backup system can be reinstalled (e.g. from a remote location).

Figure 3:
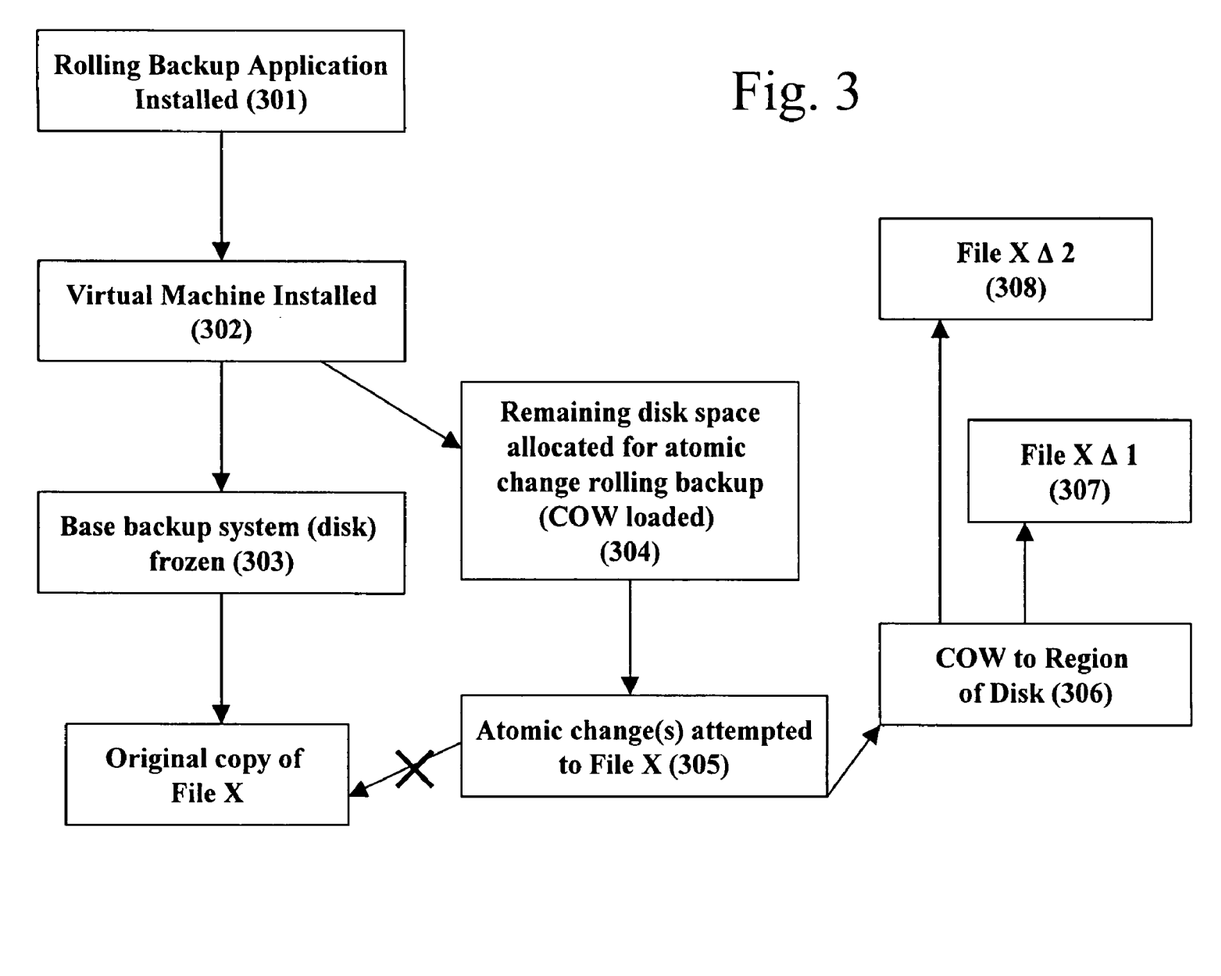
FIG. 3 illustrates a method for copy-on-write logging of file changes for rollback.

Referring to FIG. 3, a more detailed method of the rolling backup system is illustrated. First, the rolling backup system is selected to be installed (301) (e.g. via download from a remote device or computer/machine readable media). Once the rolling backup system is selected for install, a virtual machine (hypervisor) is installed (302). A presently preferred hypervisor is Lenovo® Client Virtualization Platform (LCVP). The OS will sit on top of the virtual machine. The base backup system (disk area) is frozen (303), as described above, in that any subsequent changes (e.g. writes) are committed to a separate area of the disk. To accomplish this, the remainder of the disk is allocated (304) to track atomic changes by the virtual machine.

The subsequent atomic changes (305) are tracked, captured and redirected to the allocated area of the disk by employing a copy-on-write (COW) technology (306) (e.g. via modified QCOW to allow continuous recording (capturing) of atomic changes—e.g. every I/O write operation). QCOW and ZFS are popular copy-on-write technology statements that provide useful background information on COW operations. See http://en.wikipedia.org/wiki/Qcow. The COW technology is implemented as a hard disk driver assembly that, when a write is committed, does not write to the area of the disk the OS asks, but rather writes to an archival location (incremental region) and records that position as an offset. The system does this for each subsequent attempted atomic change (e.g. write operation) such that rolling changes to a file are collected as sequential changes (307, 308, etc.), each of which is accessible as a rolling backup point on demand. Thus, if a difficulty is encountered (e.g. File X, Δ 2 is accidentally deleted by the user, File X Δ 1 and the original copy of File X are both available for instantaneous roll back).

If the data written to subsequently needs to be read, the data is read from the offset location rather than the "actual" disk location. Thus, upon a read request, the OS (e.g. Windows® XP operating system) will look the file up in the file table (e.g. a Microsoft® File Table), which indicates a set of clusters on the disk. The clusters refer to a block of sectors which is then made into a disk I/O request at the specific sector locations (logical block addresses (LBA)). At this point, what the OS ascertains it is communicating with is the hard drive. However, what the OS is actually communicating with is the system code (hypervisor), which takes the LBA and the request to look up in the table (offset location table) to ascertain if the file requested has been modified from the original backup copy. If it has not, the system allows the LBA to pass through unmodified (i.e. the requested file is the original file with no subsequent changes, thus the original disk location is the requested location). If the original copy of the file has been modified, the LBA is modified to correspond to the offset location, where the most recent copy of the file has been stored. The offset file, upon return, has its offset LBA again modified such that it is returned to the OS such that the OS believes it has obtained the original, not the offset file.

For writes, the process is much the same (e.g. the virtual machine makes the capturing and offset writing of the files transparent to the OS). Thus, upon a write, the OS chooses (via a de-fragmentation algorithm) an appropriate location to write the file to the disk. The OS then creates a write I/O with the specific location indicated. Again, the virtual machine redirects the write to a backup/offset location (incremental or active region). The data is then recorded (written) and the offset location is recorded in a table for subsequent lookup. A reply back to the OS is conducted to indicate a successful write operation with the offset address again hidden from the OS.

The above-described read and write operations do consume some processing power (e.g. 2-5% of CPU usage). The data blocks written are numerous but are also small (e.g. ~50 kb). Thus the CPU is occupied for only a relatively short period of time. Accordingly, a presently preferred minimum processor is an e8400 class processor (e.g. an Intel® Core 2 Duo processor), which allows the system to conduct the above-described processes without a noticeable reduction in system performance.

Figure 4:
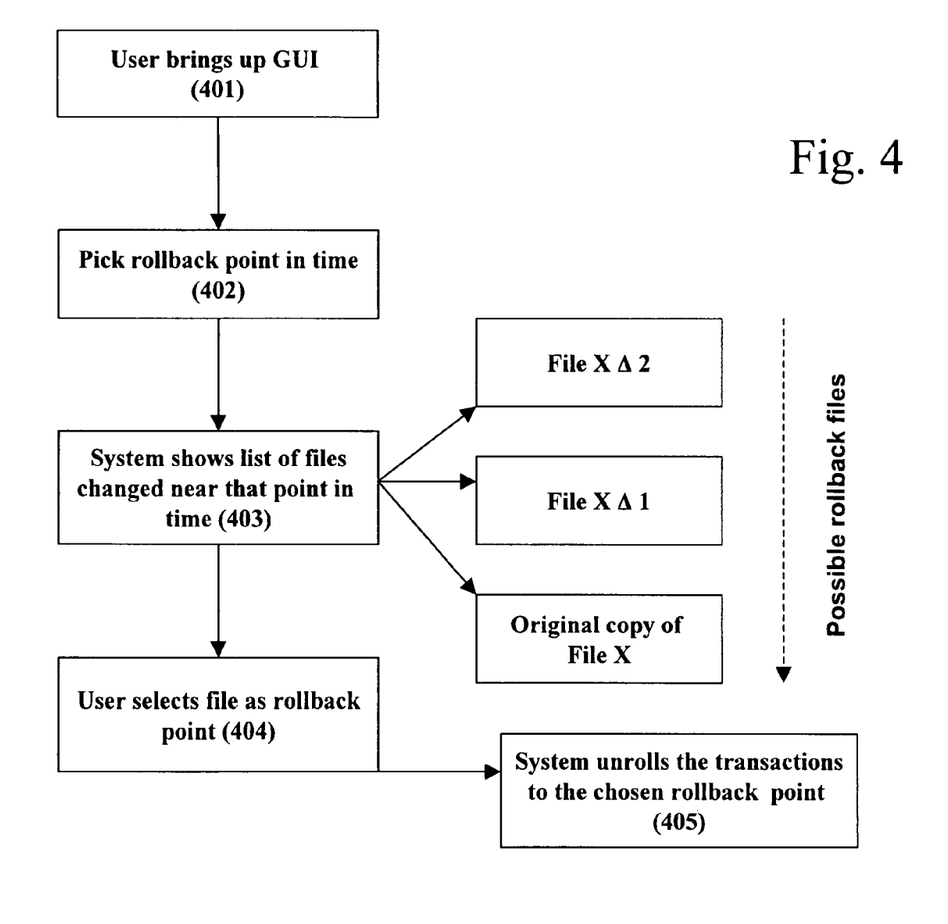
FIG. 4 illustrates a method for restoring a deleted file.

FIG. 4 illustrates a non-limiting and exemplary process for rolling back the system to recover a deleted file. First, the user will bring up the application at (401) (via a user interface, GUI). The user interface is brought up in the OS whereas the actions taken are again controlled via the hypervisor. The commands from the user interface can be sent from the OS to the hypervisor via a secure memory channel (a secure tunnel to the hypervisor is preferably utilized) or via a network. The secure memory channel is presently preferred as this method tends to be faster, less complex (networking addresses) and more secure (not subject to DNS attack) than a network implemented method.

At (402) the user picks a rollback point in time that will solve the difficulty. For example, if the file (e.g. File X Δ 2) has been accidentally deleted in the afternoon, the user may know that the file was saved (written to) in the morning (e.g. 10:00 a.m.) in a form acceptable for recovery. Thus, the user would select a point in time in the morning. Next, the application will display at (403) a list of file changes that were committed near that point in time (e.g. File X versions changed within 30 minutes of 10:00 a.m.). At (404) the user selects the file version to be restored (e.g. File X Δ 1). The system will then rollback to the rollback point (i.e. restore File X Δ 1 as the most recent file version).

Figure 5:
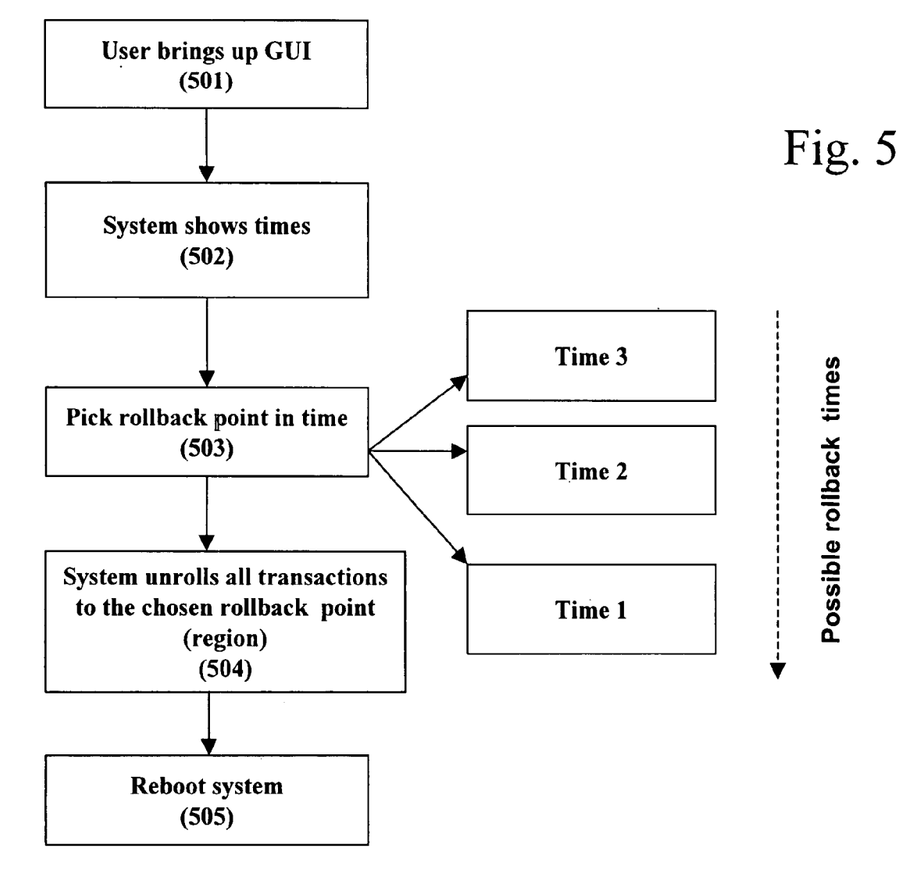
FIG. 5 illustrates a method for restoring to a previous point in time.

FIG. 5 illustrates a non-limiting and exemplary process for rolling back the system to recover from a virus attack. Again, the user brings up the rollback application at (501) via a user interface. At (502) the system shows a selection of times available for rollback (the amount and scope of available rollback times is a design choice). For example, the user may know that the system was working fine yesterday, but today the user suspects a virus has been downloaded. Thus, the system is configured to show a selection of rollback times at (502)—e.g. a rollback point in time for each day of the preceding week, including yesterday. At (503) the user selects the appropriate rollback point in time (e.g. time 2—corresponding to yesterday). At (504) the system then unrolls all the transactions (rolls back all changes) the system has made since that point in time. At (505) the system is preferably rebooted once the rollback procedure has been employed. The reboot is preferred in this case as it allows loading of clean versions of suspect files.

In brief recapitulation, at least one presently preferred embodiment of the invention provides for high-speed recovery via a continuous rollback point creation process. The system utilizes a virtualization to handle the system state and provide a rescue and recovery like solution without requiring a full system reboot. The system is configured to utilize virtualization, e.g. through the use of a hypervisor to track the fundamental system components. This enables the system to very quickly back the system up on a rolling basis via tracking atomic changes and offering the instant rollback at essentially any point following an atomic change, should common system difficulties be encountered.

Many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system and the other described elements perform the functions of the invention.

It will be readily understood by those having ordinary skill in the art that embodiments of the present invention may take the form of an entirely hardware embodiment or an embodiment containing both hardware and software elements. An embodiment that is implemented in software may include, but is not limited to, firmware, resident software, microcode, etc.

The computer readable programs may be stored in tangible computer/machine-readable (apparatus readable) medium. Examples of a computer/machine-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Accordingly, elements of the present invention may be implemented on at least one computer running suitable software programs. These may also be implemented on at least one Integrated Circuit or part of at least one Integrated Circuit. Thus, it is to be understood that the invention may be implemented in a combination of both hardware and software. Again, computer/machine-readable programs may in combination with a computer system perform the functions of the invention.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. An apparatus comprising:
a processor;
a storage device; and
a tangible program storage device embodying a program of instructions that when executed by the processor enable the apparatus to:
direct all atomic changes to incremental regions of said storage device;
continuously create roll back points corresponding to atomic changes utilizing a hypervisor; and
roll a system state back to any roll back point to restore said storage device to a particular rollback point.

2. The apparatus according to claim 1, wherein the program of instructions further enables the apparatus to:
freeze a base backup system of a storage device; and
allocate at least one remaining region of the storage device outside of the base backup system for subsequent atomic changes.

3. The apparatus according to claim 2, wherein the program of instructions further enables the apparatus to:
load a hypervisor which captures all atomic operations from an operating system.

4. The apparatus according to claim 3, further comprising:
a disk driver enabling copy-on-write operations.

5. The apparatus according to claim 1, wherein atomic changes comprise write operations.

6. The apparatus according to claim 1, wherein to roll the system state back to any roll back point comprises:
rolling the system state back to a previously saved incremental region.

7. The apparatus according to claim 1, wherein to roll the system state back to any roll back point comprises:
rolling the system state back to a previously saved incremental region without rebooting an operating system.

8. The apparatus according to claim 1, wherein the program of instructions further enables the apparatus to:
present a graphical user interface having a list of roll back points displayed therein;
wherein the apparatus is configured to allow automatic roll back to a roll back point in said list.

9. The apparatus according to claim 6, wherein the program of instructions further enables the apparatus to:
enable a user to select a file from a previously saved incremental region; and
copy the file forward to a latest system state.

10. A method comprising:
directing all atomic changes to incremental regions of a storage device;
continuously creating roll back points corresponding to atomic changes utilizing a hypervisor; and
rolling a system state back to any roll back point to restore said storage device to a particular rollback point.

11. The method according to claim 10, further comprising:
freezing a base backup system of a storage device; and
allocating at least one remaining region of the storage device outside of the base backup system for subsequent atomic changes.

12. The method according to claim 11, further comprising:
loading a hypervisor which captures all atomic operations from an operating system.

13. The method according to claim 12, further comprising:
employing a disk driver enabling copy-on-write operations.

14. The method according to claim 10, wherein atomic changes comprise write operations.

15. The method according to claim 10, further comprising:
rolling the system state back to a previously saved incremental region.

16. The method according to claim 10, wherein rolling the system state back to any roll back point comprises:
rolling the system state back to a previously saved incremental region without rebooting an operating system.

17. The method according to claim 10, further comprising:
presenting a graphical user interface having a list of roll back points displayed therein; and
rolling back to a roll back point in said list.

18. The method according to claim 15, further comprising:
selecting a file from a previously saved incremental region; and
copying the file forward to a latest system state.

19. A tangible program storage device, readable by machine, embodying a program of instructions that when executed by a processor of the machine enable the machine to:
direct all atomic changes to incremental regions of a storage device;
continuously create roll back points corresponding to atomic changes utilizing a hypervisor; and
roll a system state back to any roll back point to restore said storage device to a particular rollback point.

20. The apparatus according to claim 1, wherein the roll back points correspond to points at which incremental changes are committed to an HDD of the apparatus.

* * * * *